United States Patent
Park et al.

(10) Patent No.: US 10,489,084 B2
(45) Date of Patent: Nov. 26, 2019

(54) METHOD AND SYSTEM FOR RECLAIMING MEMORY USING READ COUNTS

(71) Applicant: SK hynix Inc., Gyeonggi-do (KR)

(72) Inventors: Byeong-Gyu Park, Gyeonggi-do (KR); Seung-Gu Ji, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/887,328

(22) Filed: Feb. 2, 2018

(65) Prior Publication Data

US 2018/0373460 A1 Dec. 27, 2018

(30) Foreign Application Priority Data

Jun. 27, 2017 (KR) .......................... 10-2017-0081084

(51) Int. Cl.
*G06F 3/06* (2006.01)
*G06F 12/00* (2006.01)

(52) U.S. Cl.
CPC .......... *G06F 3/0659* (2013.01); *G06F 3/0604* (2013.01); *G06F 3/0616* (2013.01); *G06F 3/0619* (2013.01); *G06F 3/0658* (2013.01); *G06F 3/0673* (2013.01); *G06F 3/0679* (2013.01); *G06F 12/00* (2013.01)

(58) Field of Classification Search
CPC .... G06F 3/0659; G06F 3/0604; G06F 3/0616; G06F 3/0673; G06F 3/0619

USPC ........................................................ 711/103
See application file for complete search history.

(56) References Cited

U.S. PATENT DOCUMENTS

| | | | | |
|---|---|---|---|---|
| 2016/0335144 | A1* | 11/2016 | Cai | G06F 11/073 |
| 2017/0177425 | A1* | 6/2017 | Jei | G06F 11/076 |
| 2017/0235487 | A1* | 8/2017 | Shin | G06F 3/0611 |
| | | | | 711/103 |

FOREIGN PATENT DOCUMENTS

| | | |
|---|---|---|
| KR | 1020120001405 | 1/2012 |
| KR | 1020150140496 | 12/2015 |

* cited by examiner

*Primary Examiner* — Than Nguyen
(74) *Attorney, Agent, or Firm* — IP & T Group LLP

(57) ABSTRACT

A method of a read reclaim operation of a memory controller, the method comprising: updating, during each read operation for a read operation unit among one or more read operation units included in each of a plurality of memory blocks, a first index for a corresponding one among the plurality of memory blocks and a second index for the read operation unit; detecting a warming block, the first index of which is over a first threshold among the plurality of memory blocks; detecting a read-hot-spot, the updated second index of which is over a second threshold among the read operation units included in the warming block; and performing the read reclaim operation on the read-hot-spot.

20 Claims, 13 Drawing Sheets

METHOD AND SYSTEM FOR RECLAIMING MEMORY USING READ COUNTS

CROSS-REFERENCE TO RELATED APPLICATIONS

The present application claims priority to Korean Patent Application No. 10-2017-0081084, filed on Jun. 27, 2017, which is incorporated herein by reference in its entirety.

BACKGROUND

1. Field

Exemplary embodiments of the present invention relate to a memory system. Particularly, exemplary embodiments relate to a memory system for processing data by using a memory device, and a method for operating the memory system.

2. Description of the Related Art

The paradigm for computing environments is shifting toward ubiquitous computing which allows users to use computer systems anytime anywhere. For this reason, the demands for portable electronic devices, such as mobile phones, digital cameras, and laptop computers are soaring. Those electronic devices generally include a memory system using a memory device as a data storage device. The data storage device may be used as a main memory unit or an auxiliary memory unit of an electronic device.

Since the data storage device using a memory device does not have a mechanical driving unit, it may have excellent stability and durability. Also, the data storage device has a quick data access rate with low power consumption. Non-limiting examples of the data storage device having such advantages include Universal Serial Bus (USB) memory devices, memory cards of diverse interfaces, Solid-State Drives (SSD), and the like.

SUMMARY

Embodiments of the present invention are directed to a memory system capable of perform an improved read reclaim operation with less memory and detecting a degraded memory device with higher accuracy.

In accordance with an embodiment of the present invention, a method of a read reclaim operation of a memory controller, the method comprising: updating, during each read operation for a read operation unit among one or more read operation units included in each of a plurality of memory blocks, a first index for a corresponding one among the plurality of memory blocks and a second index for the read operation unit; detecting a warming block, the first index of which is over a first threshold among the plurality of memory blocks; detecting a read-hot-spot, the updated second index of which is over a second threshold among the read operation units included in the warming block; and performing the read reclaim operation on the read-hot-spot.

Preferably, wherein the first index is a remaining value obtained by subtracting an average read count value of the plurality of memory blocks from a read count value of a memory block, in which the read operation is performed for the read operation units.

Preferably, wherein the average read count value of the plurality of memory blocks is obtained by dividing sum of the read count values of the plurality of memory blocks by a number of the plurality of memory blocks.

Preferably, wherein the second index is a read count, which is increased according to a read operation performed in the read operation unit.

Preferably, wherein the read operation unit is the same as or smaller than a page of a memory device.

Preferably, wherein the first index is an increased amount of a read count value of the memory block for a predetermined time period.

Preferably, wherein the predetermined time period is a time interval, in which an accumulated amount of the read count value of the memory block is over a predetermined value.

In accordance with an embodiment of the present invention, a controller comprising: a counter suitable for updating, during each read operation for a read operation unit among one or more read operation units included in each of a plurality of memory blocks, a first index for a corresponding one among the plurality of memory blocks and a second index for the read operation unit; a detector suitable for detecting a warming block, the first index of which is over a first threshold among the plurality of memory blocks, and detecting a read-hot-spot, the updated second index of which is over a second threshold among the read operation units included in the warming block, wherein the controller performs a read reclaim operation on the read-hot-spot.

Preferably, wherein the first index is a remaining value obtained by subtracting an average read count value of the plurality of memory blocks from a read count value of a memory block, in which the read operation is performed for the read operation units.

Preferably, wherein the average read count value of the plurality of memory blocks is obtained by dividing sum of the read count values of the plurality of memory blocks by a number of the plurality of memory blocks.

Preferably, wherein the second index is a read count, which is increased according to a read operation performed in the read operation unit.

Preferably, wherein the read operation unit is the same as or smaller than a page of a memory device.

Preferably, wherein the first index is an increased amount of a read count value of the memory block for a predetermined time period.

Preferably, wherein the predetermined time period is a time interval, in which an accumulated amount of the read count value of the memory block is over a predetermined value.

In accordance with an embodiment of the present invention, a semiconductor memory system comprising: a semiconductor memory device; and a controller, wherein the controller includes: a counter suitable for updating, during each read operation for a read operation unit among one or more read operation units included in each of a plurality of memory blocks, a first index for a corresponding one among the plurality of memory blocks and a second index for the read operation unit; a detector suitable for detecting a warming block, the first index of which is over a first threshold among the plurality of memory blocks, and detecting a read-hot-spot, the updated second index of which is over a second threshold among the read operation units included in the warming block, wherein the controller performs a read reclaim operation on the read-hot-spot.

Preferably, wherein the first index is a remaining value obtained by subtracting an average read count value of the plurality of memory blocks from a read count value of a memory block, in which the read operation is performed to the read operation units.

Preferably, wherein the average read count value of the plurality of memory blocks is obtained by dividing sum of the read count values of the plurality of memory blocks by a number of the plurality of memory blocks.

Preferably, wherein the second index is a read count, which is increased according to a read operation performed in the read operation unit.

Preferably, wherein the read operation unit is the same as or smaller than a page of a memory device.

Preferably, wherein the first index is an increased amount of a read count value of the memory block for a predetermined time period, and wherein the predetermined time period is a time interval, in which an accumulated amount of the read count value of the memory block is over a predetermined value.

DETAILED DESCRIPTION

Figure 1:
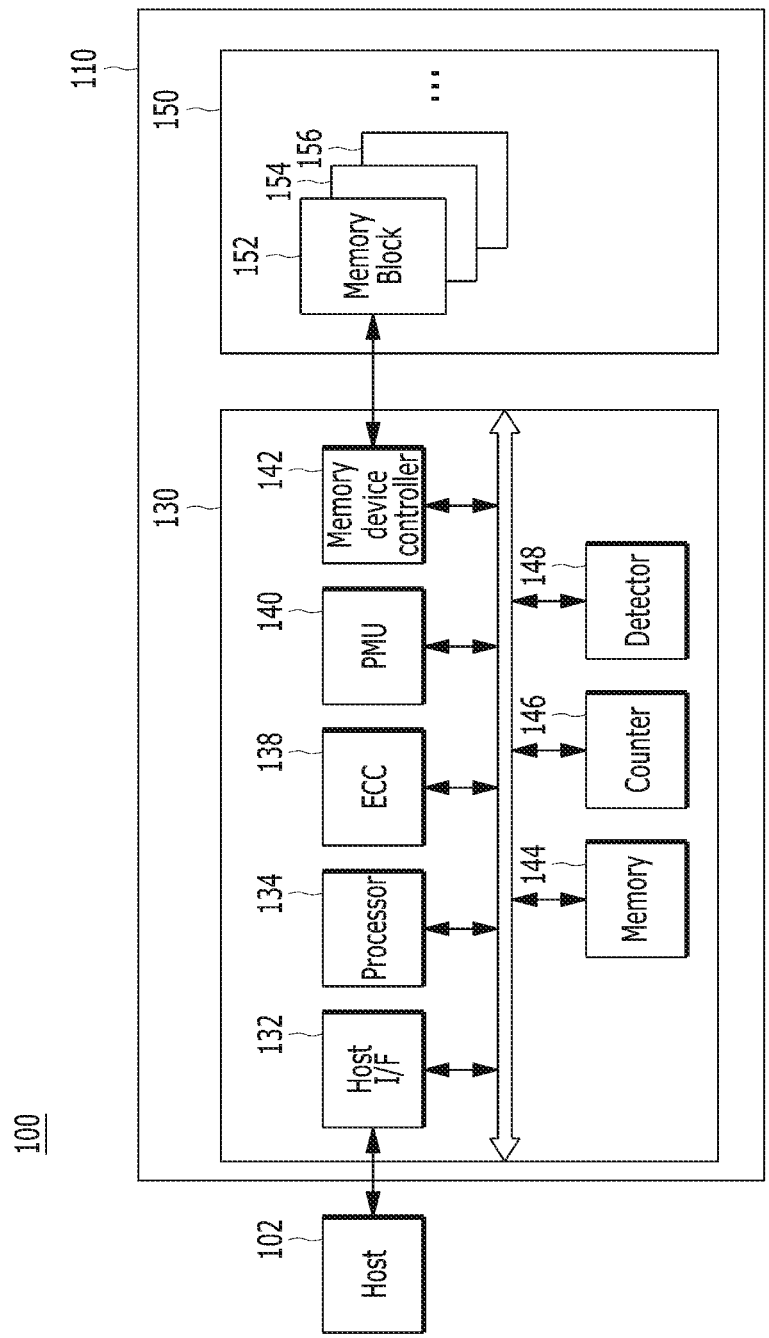
FIG. 1 is a block diagram illustrating a data processing system including a memory system in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms are intended to include the plural forms as well, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 in accordance with an embodiment of the present invention.

Referring to FIG. 1, the data processing system 100 may include a host 102 coupled to a memory system 110.

The host 102 may include, for example, a portable electronic device such as a mobile phone, an MP3 player and a laptop computer or an electronic device such as a desktop computer, a game player, a TV, a projector, and the like.

The memory system 110 may operate in response to a request from the host 102, and in particular, store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Examples of suitable storage devices include a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device such as a dynamic random access memory (DRAM) and a static RAM (SRAM), and nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM), and a flash memory.

The memory system 110 may include a memory device 150 which stores data to be accessed by the host 102, and a controller 130 which may control storage of data in the memory device 150.

The controller 130 and the memory device 150 may be integrated into a single semiconductor device, which may be included in the various types of memory systems as exemplified above.

The memory system 110 may be configured as part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3D television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various component elements configuring a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory blocks 152 to 156, each of the memory blocks 152 to 156 may include a plurality of pages. Each of the pages may include a plurality of memory cells to which a plurality of word lines (WL) are electrically coupled.

The controller 130 may control overall operations of the memory device 150, such as read, write, program, and erase operations. For example, the controller 130 of the memory system 110 may control the memory device 150 in response to a request from the host 102. The controller 130 may provide the data read from the memory device 150, to the host 102, and/or may store the data provided from the host 102 into the memory device 150.

The controller 130 may include a host interface (I/F) unit 132, a processor 134, an error correction code (ECC) unit 138, a power management unit (PMU) 140, a memory device controller 142 such as a NAND flash controller (NFC), a memory 144, a counter 146, and a detector 148, all operatively coupled via an internal bus.

The host interface unit 132 may process commands and data provided from the host 102, and may communicate with the host 102 through at least one of various interface protocols such as universal serial bus (USB), multimedia card (MMC), peripheral component interconnect-express (PCI-E), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDDC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, modules, systems or devices for the error correction operation.

The PMU 140 may provide and manage power of the controller 130.

The memory device controller 142 may serve as a memory/storage interface between the controller 130 and the memory device 150 to allow the controller 130 to control the memory device 150 in response to a request from the host 102. The memory device controller 142 may generate a control signal for the memory device 150 and process data to be provided to the memory device 150 under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be implemented with a volatile memory. The memory 144 may be implemented with a static random access memory (SRAM) or a dynamic random access memory (DRAM). Although FIG. 1 exemplifies the memory 144 disposed within the controller 130, the present embodiment is limited thereto. That is, the memory 144 may be disposed within or out of the controller 130. For example, the memory 144 may be embodied by an external volatile memory having a memory interface transferring data between the memory 144 and the controller 130.

The counter 146 may count a number of read operations performed on the respective memory blocks 152 to 156 or a plurality of pages included in the respective memory blocks 152 to 156.

The detector 148 may detect a memory block or a page, to which a read operation is frequently performed, based on the number of read operations counted by the detector 148.

The controller 132 may perform a read reclaim operation on the detected memory block.

The processor 134 may control the overall operations of the memory system 110. The processor 134 may drive firmware, which is referred to as a flash translation layer (FTL), to control the general operations of the memory system 110.

A FTL may perform an operation as an interface between the host 102 and the memory device 150. The host 102 may request to the memory device 150 write and read operations through the FTL.

The FTL may manage operations of address mapping, garbage collection, wear-leveling and so forth. Particularly, the FTL may store map data. Therefore, the controller 130 may map a logical address, which is provided from the host 102, to a physical address of the memory device 150 through the map data. The memory device 150 may perform an operation like a general device because of the address mapping operation. Also, through the address mapping operation based on the map data, when the controller 130 updates data of a particular page, the controller 130 may program new data into another empty page and may invalidate old data of the particular page due to a characteristic of a flash memory device. Further, the controller 130 may store map data of the new data into the FTL.

The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 100, and thus reliable bad block management is required.

Figure 2:
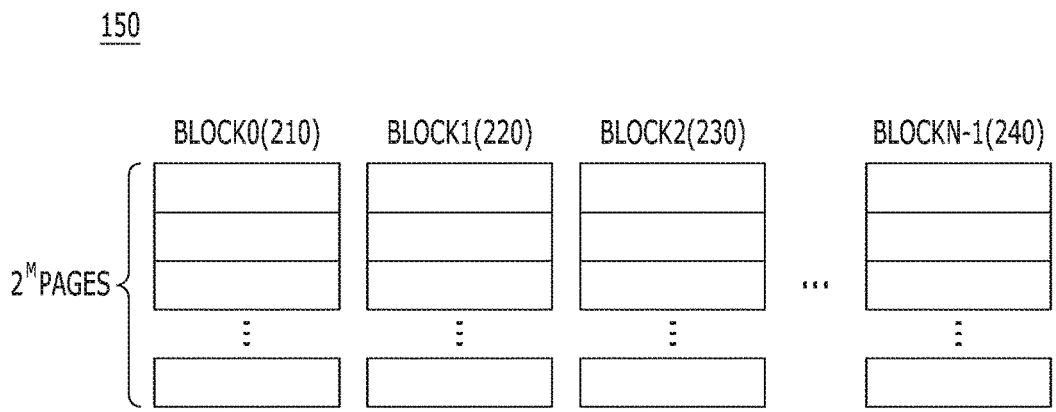
FIG. 2 is a schematic diagram illustrating an exemplary configuration of a memory device employed in the memory system of FIG. 1.

FIG. 2 is a schematic diagram illustrating the memory device 150 of FIG. 1.

Referring to FIG. 2, the memory device 150 may include the plurality of memory blocks BLOCK 0 to BLOCKN-1, and each of the blocks BLOCK 0 to BLOCKN-1 may include a plurality of pages, for example, $2^M$ pages, the number of which may vary according to circuit design. The memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be defined as a triple level cell (TLC) memory block.

Figure 3:
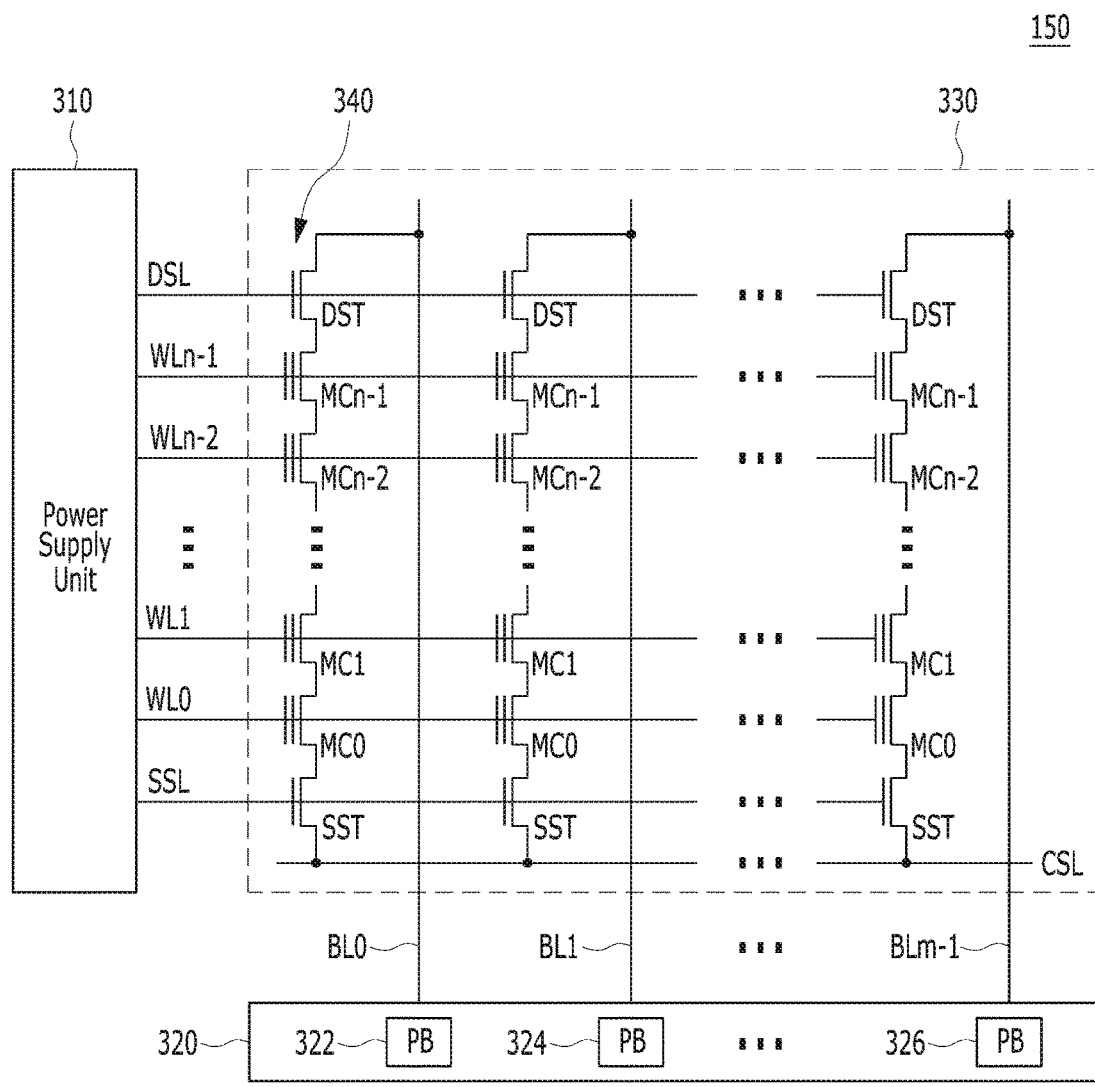
FIG. 3 is a circuit diagram illustrating an exemplary configuration of a memory cell array of a memory block in the memory device of FIG. 2.

FIG. 3 is a circuit diagram illustrating a memory block 330 in the memory device 150 of FIG. 1. For example, the memory block 330 may correspond to any of the plurality of memory blocks 152 to 156 shown in FIG. 1.

Referring to FIG. 3, the memory block 330 of the memory device 150 may include a plurality of cell strings 340, which are electrically coupled to bit lines BL0 to BLm-1. The cell string 340 of each column may include at least one drain select transistor DST and at least one source select transistor SST. A plurality of memory cells or a plurality of memory cell transistors MC0 to MCn-1 may be electrically coupled in series between the select transistors DST and SST. The respective memory cells MC0 to MCn-1 may be configured by single level cells (SLC) each of which may store 1 bit of information, or by multi-level cells (MLC) each of which may store data information of a plurality of bits. The cell strings 340 may be electrically coupled to the corresponding bit lines BL0 to BLm-1. For reference, in FIG. 3, 'DSL' denotes a drain select line, 'SSL' denotes a source select line, and 'CSL' denotes a common source line.

While FIG. 3 only shows, as an example, the memory block 330 which is configured by NAND flash memory cells, it is to be noted that the memory block 330 of the memory device 150 according to the embodiment is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A power supply unit 310 of the memory device 150 may provide word line voltages, for example, a program voltage, a read voltage, and a pass voltage, to be supplied to respective word lines according to an operation mode and voltages to be supplied to bulks, for example, well regions in which the memory cells are formed. The power supply unit 310 may perform a voltage generating operation under the control of a control circuit (not shown). The power supply unit 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
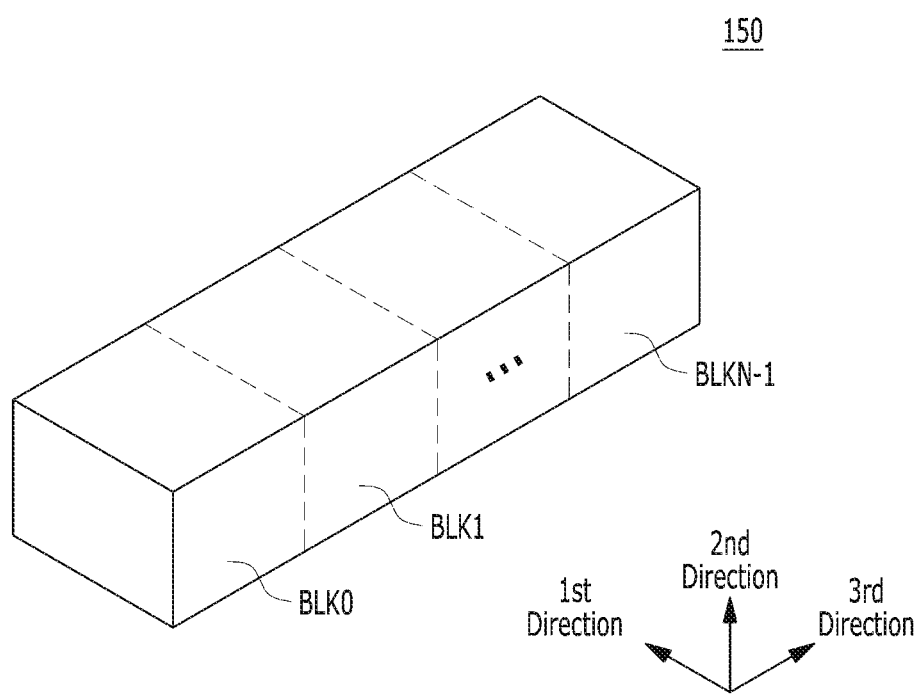
FIG. 4 is a schematic diagram illustrating an exemplary three-dimensional structure of the memory device of FIG. 2.

FIG. 4 is a schematic diagram illustrating a three-dimensional (3D) structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

Figure 5:
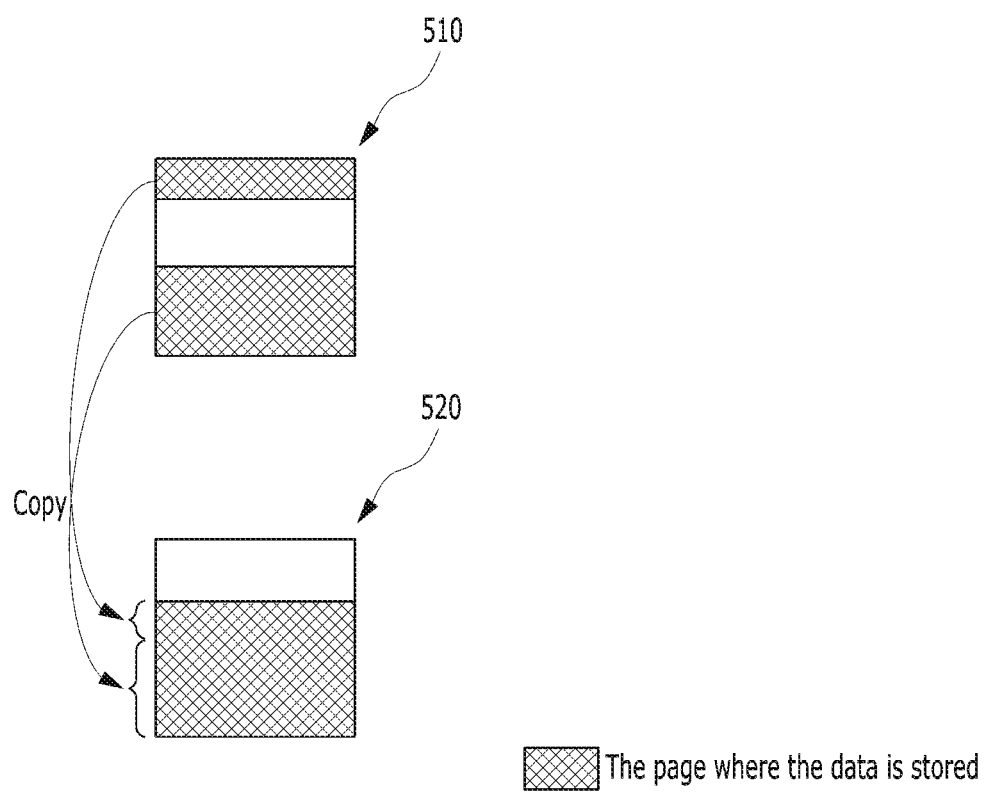
FIG. 5 is a schematic diagram illustrating a general read reclaim operation.

FIG. 5 is a schematic diagram illustrating a general read reclaim operation.

In general, a read reclaim operation is an operation of moving data stored in a part or a whole of a memory block, a number of read operations performed to which is greater than a threshold among memory blocks, into another memory block.

Referring to FIG. 5, a read reclaim operation may be performed on a first storage region 510. Data stored in the first storage region 510 may be copied to another storage region, for example, a second storage region 520. The controller 130 may read data stored in the first storage region 510. The controller 130 may perform a read operation on pages storing data in the first storage region 510. Then, the controller 130 may program the data, which is read from the first storage region 510, into the second storage region 520.

The first and second storage regions 510 and 520 may be of a memory block. A memory block may include a plurality of pages. A read operation may be performed on the memory device 150 by a unit of a page or a smaller unit than a page.

According to a prior art, relatively small size of memory may be used when a target unit size of a read reclaim operation is relatively great (for example, a memory block or greater). However, a read operation is performed by a unit of a page or a smaller unit than a page, and therefore a precise location of deterioration may not be detected when a target unit size of a read reclaim operation is relatively great. For example, when a target unit size of a read reclaim operation is a memory block and numbers of read operations performed on only some pages in a particular memory block are greater than a threshold, a number of read operations performed on the memory block is greater than the threshold and therefore the memory block is a target of a read reclaim operation. However, in the particular memory block as the target of a read reclaim operation, it is not possible to precisely detect pages since each number of read operations performed on is greater than the threshold.

On the other hand, relatively great size of memory may be used when a target unit size of a read reclaim operation is relatively small (for example, a page or smaller). However, a read operation is performed by a unit of a page or a smaller unit than a page, and therefore a precise location of deterioration may be detected when a target unit size of a read reclaim operation is relatively small.

To summarize, according to a prior art, there is a trade-off between usage size of a memory and precise detection of location of deterioration when setting sizes of the target unit size and the detector size as greater (for example, a unit of a memory block or greater) or smaller (for example, a unit of a page or smaller) since sizes of the target unit size and the detector size are the same as each other for a read reclaim operation.

In order to solve the above-described problem, in accordance with an embodiment of the present invention, the target unit size and the detector size may be different from each other for a read reclaim operation. In accordance with an embodiment of the present invention, for a read reclaim operation, the target unit size may be equal to or greater than a memory block while the detector size may be equal to or less than a page. Therefore, a precise location of deterioration may be detected even by using the memory 144 of a small size.

Figure 6A:
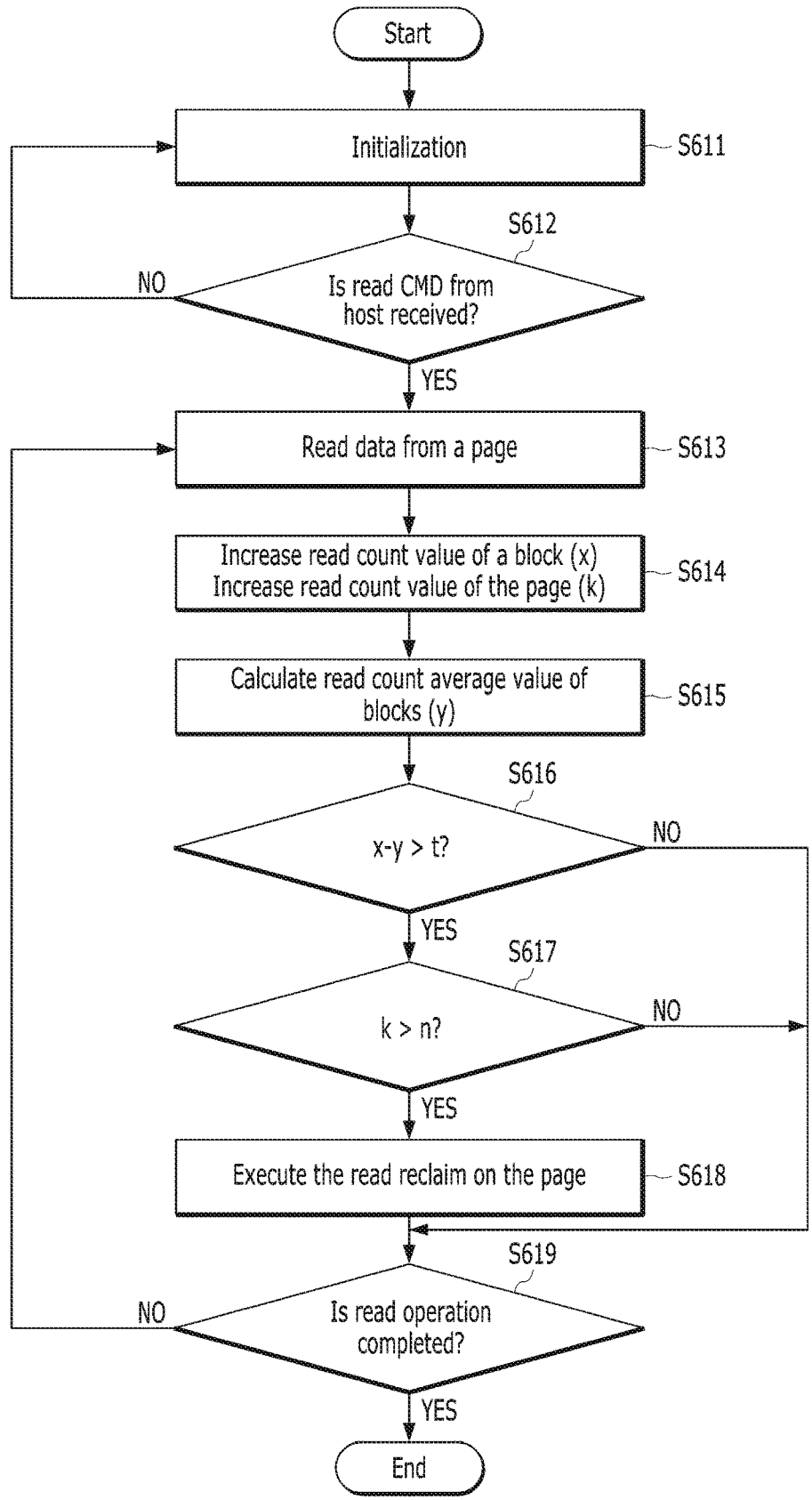
FIG. 6A is a flowchart illustrating a read reclaim operation in accordance with an embodiment of the present invention.

FIG. 6A is a flowchart illustrating a read reclaim operation in accordance with an embodiment of the present invention.

Referring to FIG. 6A, the controller 130 may perform initialization at step S611, and may sequentially perform steps S612 to S619 in order to check whether a read command is generated a predetermined number of times or more from the host after the initialization step S611.

The initialization may include initialization of various buffers and the counter 146.

At step S612, the controller 130 may check whether a read command is received from the host.

At step S613, the controller 130 may read data from the memory device 150. The read operation may be performed by a unit of a page or a smaller unit than a page (hereinafter, collectively referred to as a unit of a page).

At step S614, the counter 146 may increase a read count value ("x") of a memory block including a target page, to which the read operation is performed, by an amount of "1" according to the read operation by a unit of a page at step S613. Also, the counter 146 may increase a read count value ("k") of the target page by an amount of "1".

At step S615, the counter 146 may calculate an average read count value ("y") of memory blocks, which store valid data among memory blocks, by a number of available memory blocks.

At step S616, the detector 148 may determine whether or not a remaining value obtained by subtracting the average read count value ("y") of step S615 from the read count value ("x") of step S614 is over a predetermined threshold. A memory block, which has the remaining value over the predetermined threshold, may be a warming block having a greater read count value than that of other memory blocks.

As a result of determination of step S616, step S617 may be performed on the warming block (that is, 'YES' at step S616) and step S619 may be performed to remaining memory blocks other than the warming block (that is, 'NO' at step S616).

In the warming block, a page may have a greater read count than a predetermined number while another page may have a less read count than the predetermined number. The pages having a less read count than the predetermined number may not be deteriorated and therefore the controller 130 may not have to perform a read reclaim operation on those pages. Therefore, at step S617, the detector 148 may detect pages having a less read count than the predetermined number.

At step S617, the detector 148 may determine whether or not the read count value ("k") of respective pages included in the warming block of step S616 is greater than a predetermined value ("n"). In the warming block, pages having the read count value ("k") greater than the predetermined value ("n") at step S617 may be read-hot-spots as targets of a read reclaim operation.

At step S618, the controller 130 may perform a read reclaim operation on the read-hot-spots. The controller 130 may program data of the read-hot-spots into another memory device.

At step S619, the controller 130 may check completion of the read operation performed in response to the read command of step S612. When the read operation is not completed, the process may go back to step S613 and steps S613 to S619 may be repeated.

Figure 6B:
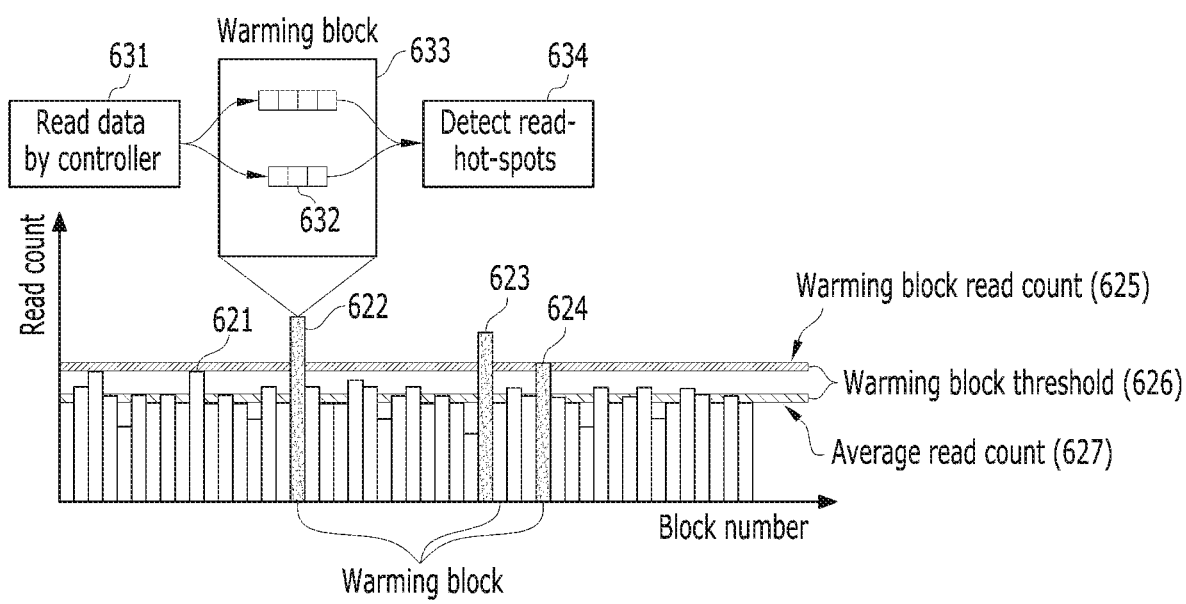
FIG. 6B is a diagram illustrating a detection of the warming block and the read-hot-spots according to steps S614 to S617 of FIG. 6A.

FIG. 6B is a diagram illustrating a detection of the warming block and the read-hot-spots according to steps S614 to S617 of FIG. 6A in accordance with an embodiment of the present disclosure.

As illustrated in FIG. 6B, x-axis of the graph may represent memory block numbers and y-axis of the graph may represent a read count. The graph of FIG. 6B illustrates a read count for each of memory blocks.

As described with reference to FIG. 6A, at step S614, the counter 146 may increase a read count value ("x") of a memory block including a page, to which the read operation is performed, by an amount of "1" according to the read operation by a unit of a page at step S613. Also, the counter 146 may increase a read count value ("k") of the page, on which the read operation is performed, by an amount of "1". Also at step S615, the counter 146 may calculate an average read count value 627 of memory blocks included in the memory device 150, based on the increased read count values.

At step S616, the detector 148 may determine whether or not a remaining value obtained by subtracting the average read count value 627 from the read count value ("x") of the memory block is over a predetermined threshold. Also, the detector 148 may detect as the warming block a memory block, which corresponds to the remaining value obtained by subtracting the average read count value 627 from the read count value ("x") of the memory block is over the predetermined threshold. That is, when sum of the average read count value 627 of the memory blocks and the predetermined threshold 626 is a warming block read count value 625, the detector 148 may detect a block having a read count value greater than the warming block read count value 625 as a warming block.

For example, as to memory blocks 621 to 624 illustrated in FIG. 6B, the read count value of the memory block 621 is smaller than the warming block read count value 625 and thus the memory block 621 may not be detected as a warming block. On the other hand, each read count value of the respective memory blocks 622 to 624 is greater than the warming block read count value 625 and thus the respective memory blocks 622 to 624 may be detected as a warming block.

As described with reference to FIG. 6A, upon receiving a read command from a host, the controller 130 may read data from the memory device 150 (see "631" in the figure) and the detector 148 may detect read-hot-spots 634 in the warming block 633. During a read operation on the warming block 633, the detector 148 may determine whether or not the read count value of the unit of a page 632 in the warming block is over a predetermined value. When the read count value of the unit of a page 632 in the warming block is determined as over a predetermined value, the detector 148 may detect the unit of a page 632 as the read-hot-spot 634. Deterioration of memory cells may be prevented through a read reclaim operation on the read-hot-spot 634 detected by the detector 148.

Figure 7A:
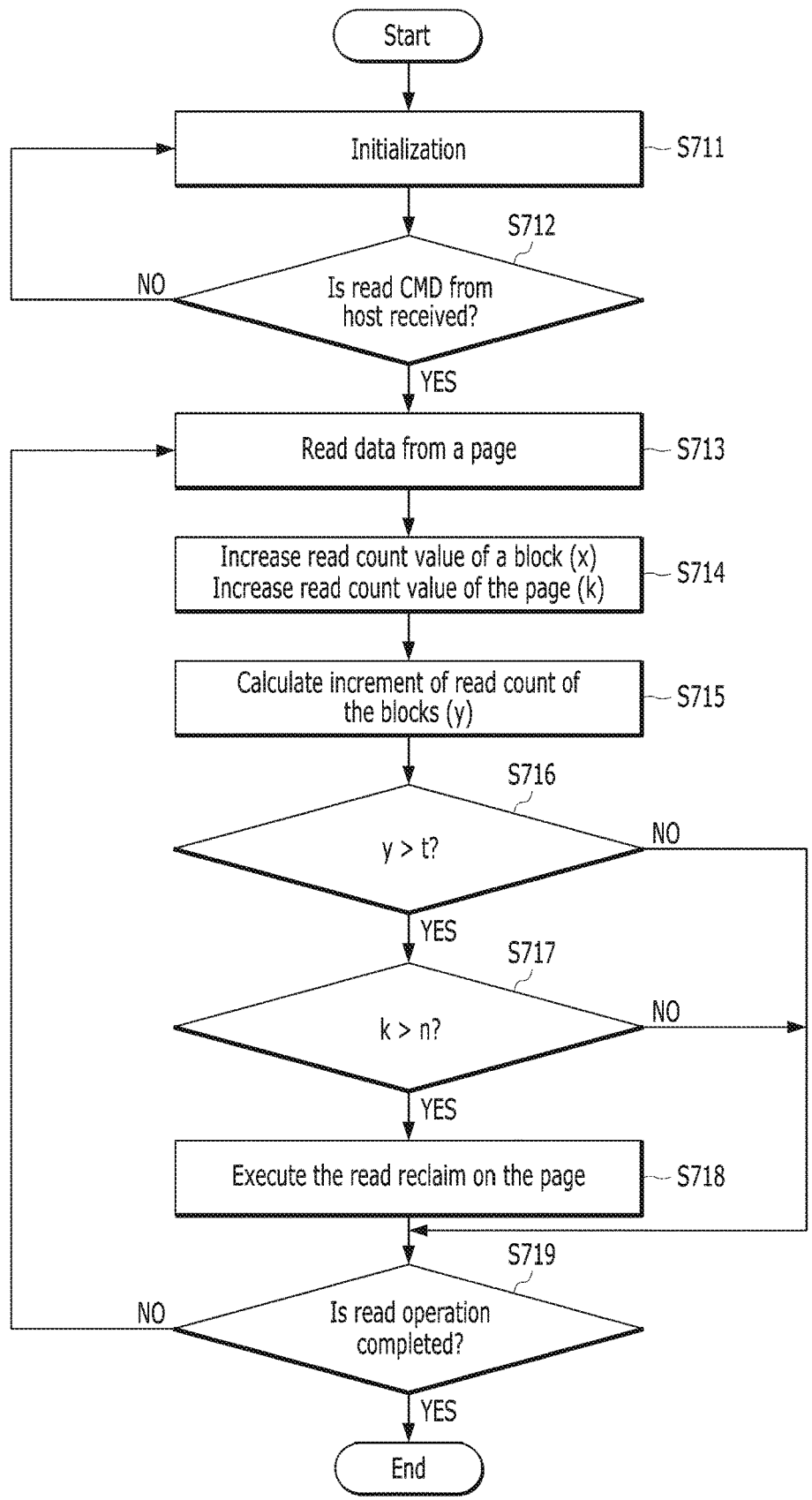
FIG. 7A is a flowchart illustrating a read reclaim operation in accordance with an embodiment of the present invention.

FIG. 7A is a flowchart illustrating a read reclaim operation in accordance with an embodiment of the present invention.

Referring to FIG. 7A, the controller 130 may perform initialization at step S711, and may sequentially perform steps S712 to S719 in order to check whether a read command is generated a predetermined number of times or more from the host after the initialization step S611.

The initialization may include initialization of various buffers and the counter 146.

At step S712, the controller 130 may check whether a read command is received from the host.

At step S713, the controller 130 may read data from the memory device 150. The read operation may be performed by the unit of a page.

At step S714, the counter 146 may increase a read count value ("x") of a memory block including a target page by an amount of "1" according to the read operation by a unit of a page at step S713. Also, the counter 146 may increase a read count value ("k") of the target page by an amount of "1".

At step S715, the counter 146 may calculate an increased amount ("y") of the read count value of each memory block currently storing valid data. The increased amount ("y") of the read count value may be for a predetermined time period.

In an embodiment, the predetermined time period may mean a time interval during which an accumulated read count value of a memory block exceeds a predetermined value for a predetermined time period. In addition in an embodiment, a user may arbitrarily set an optimal value for the predetermined period.

At step S716, the detector 148 may determine whether or not the increased amount ("y") of the read count value of step S715 is over a predetermined threshold. A memory block, which has the increased amount ("y") of the read count value of step S715 over the predetermined threshold, may be a warming block having a greater read count value than that of other memory blocks.

As a result of determination of step S716, step S717 may be performed on the warming block (that is, 'YES' at step S716) and step S719 may be performed on remaining memory blocks other than the warming block (that is, 'NO' at step S716).

At step S717, the detector 148 may determine whether or not the read count value ("k") of respective pages included in the warming block of step S716 is greater than a predetermined value ("n"). In the warming block, pages having the read count value ("k") greater than the predetermined value ("n") at step S717 may be read-hot-spots as targets of a read reclaim operation.

At step S718, the controller 130 may perform a read reclaim operation on the read-hot-spots. The controller 130 may program data of the read-hot-spots into another memory device.

At step S719, the controller 130 may check completion of the read operation performed in response to the read command of step S712. When the read operation is not completed, the process may go back to step S713 and steps S713 to S719 may be repeated.

Figure 7B:
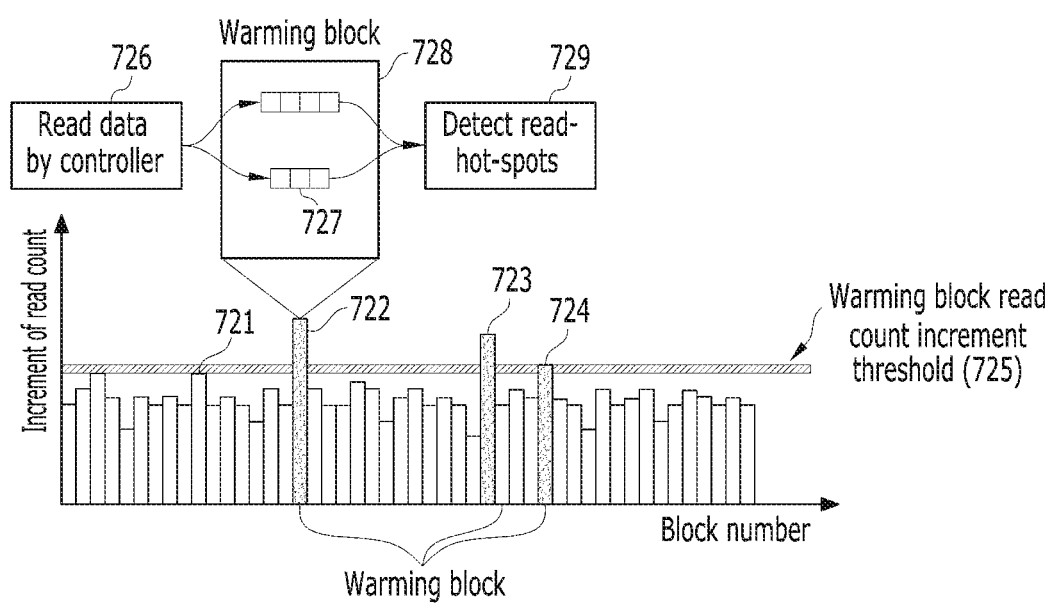
FIG. 7B is a diagram illustrating a detection of the warming block and the read-hot-spots according to steps S714 to S717 of FIG. 7A.

FIG. 7B is a diagram illustrating a detection of the warming block and the read-hot-spots according to steps S714 to S717 of FIG. 7A in accordance with an embodiment of the present invention.

As illustrated in FIG. 7B, x-axis of the graph may represent memory block numbers and y-axis of the graph may represent an increased amount of a read count. The graph of FIG. 7B illustrates an increased amount of a read count for each of memory blocks.

As described with reference to FIG. 7A, at step S714, the counter 146 may increase a read count value ("x") of a memory block including a page, to which the read operation is performed, by an amount of "1" according to the read operation by a unit of a page at step S713. Also, the counter 146 may increase a read count value ("k") of the page, to which the read operation is performed, by an amount of "1". Also at step S715, the counter 146 may calculate an increased amount ("y") of the read count value of memory blocks included in the memory device 150, based on the increased read count values. The increased amount ("y") of the read count value may be an increased amount of the read count value of a memory block, which currently stores valid data among memory blocks included in the memory device 150, for a predetermined time period. In an embodiment, the predetermined time period may mean a time interval during which an accumulated read count value of a memory block exceeds a predetermined value for a predetermined time period. In addition in an embodiment, a user may arbitrarily set an optimal value for the predetermined period.

At step S716, the detector 148 may determine whether or not an increased amount ("y") of the read count value of the memory block is over a predetermined threshold. Also, the detector 148 may detect as the warming block a memory block that has the increased amount ("y") of the read count value over the predetermined threshold.

For example, as to memory blocks 721 to 724 illustrated in FIG. 7B, the increased amount ("y") of the read count value of the memory block 721 is smaller than the warming block read count increment 725 and thus the memory block 721 may not be detected as a warming block. On the other hand, since the increased amount of the read count value of each of the respective memory blocks 722 to 724 is greater than the warming block read count increment 725, the respective memory blocks 722 to 724 may be detected as a warming block.

As described with reference to FIG. 7A, upon receiving a read command from a host, the controller 130 may read data from the memory device 150 (see "726" in the figure) and the detector 148 may detect read-hot-spots 729 in the warming block 728. During a read operation on the warming block 728, the detector 148 may determine whether or not the increased amount of the read count value of the unit of a page 727 in the warming block is over a predetermined value. When the increased amount of the read count value of the unit of a page 727 in the warming block is determined as over a predetermined value, the detector 148 may detect the unit of a page 727 as the read-hot-spot 729. Deterioration of memory cells may be prevented through a read reclaim operation on the read-hot-spot 729 detected by the detector 148.

Figure 8:
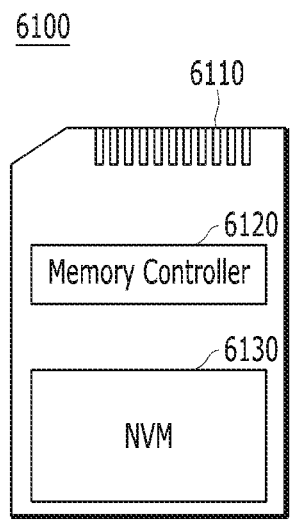
FIGS. 8 to 16 are diagrams schematically illustrating application examples of the data processing system of FIG. 1, in accordance with various embodiments of the present invention.

FIG. 8 is a diagram schematically illustrating another example of the data processing system including the memory system in accordance with an embodiment. FIG. 8 schematically illustrates a memory card system to which the memory system in accordance with an embodiment is applied.

Referring to FIG. 8, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 to 7B, and the memory device 6130 may correspond to the memory device 150 of the memory system 110 described with reference to FIGS. 1 to 7B.

Thus, the memory controller 6120 may include a RAM, a processing unit, a host interface, a memory interface and an error correction unit.

The memory controller 6120 may communicate with an external device, for example, the host 102 of FIG. 1 through the connector 6110. For example, as described with reference to FIGS. 1 to 7B, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with an embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device. For example, the memory controller 6120 and the memory device 6130 may construct a solid-state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 9:
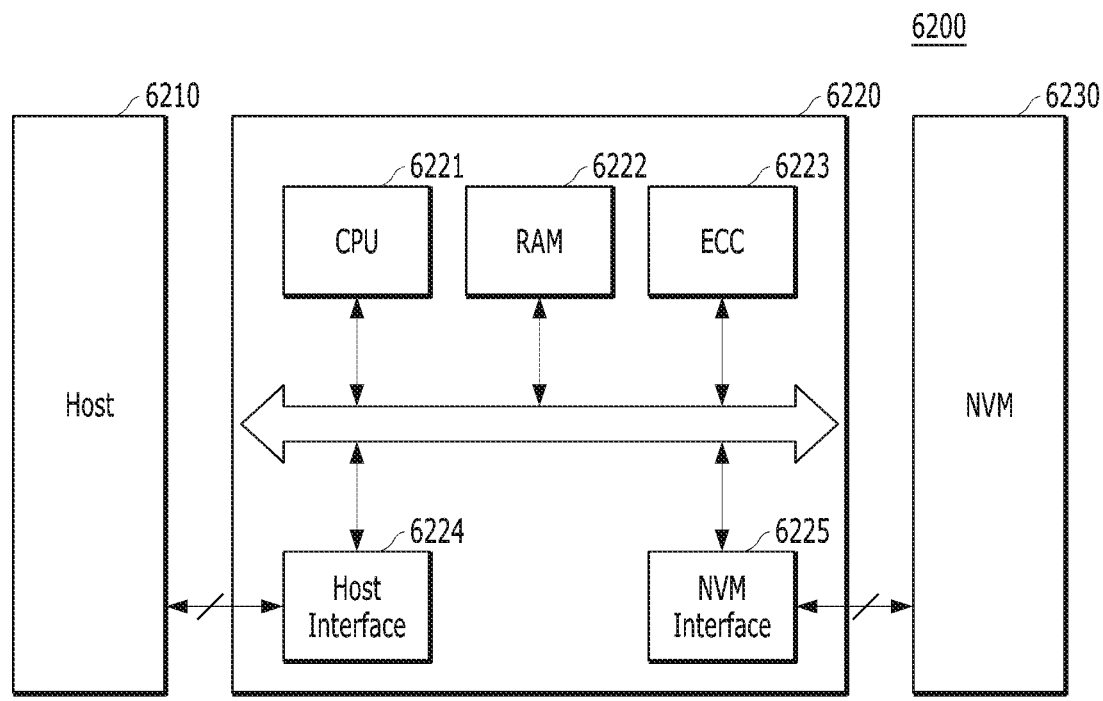

FIG. 9 is a diagram schematically illustrating another example of the data processing system including the memory system in accordance with an embodiment.

Referring to FIG. 9, the data processing system 6200 may include a memory device 6230 having one or more nonvolatile memories and a memory controller 6220 for controlling the memory device 6230. The data processing system 6200 illustrated in FIG. 9 may serve as a storage medium such as a memory card (CF, SD, micro-SD or the like) or USB device, as described with reference to FIGS. 1 to 7B. The memory device 6230 may correspond to the memory device 150 in the memory system 110 illustrated in FIGS. 1 to 7B, and the memory controller 6220 may correspond to the controller 130 in the memory system 110 illustrated in FIGS. 1 to 7B.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device

6230. When the RAM 6222 is used as a cache memory, the RAM 6222 may assist the low-speed memory device 6230 to operate at high speed.

The ECC circuit 6223 may correspond to the ECC unit 138 illustrated in FIGS. 1 to 7B. As described with reference to FIGS. 1 to 7B, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIGS. 1 to 7B, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with an embodiment may be applied to wired/wireless electronic devices or particularly a mobile electronic device.

Figure 10:
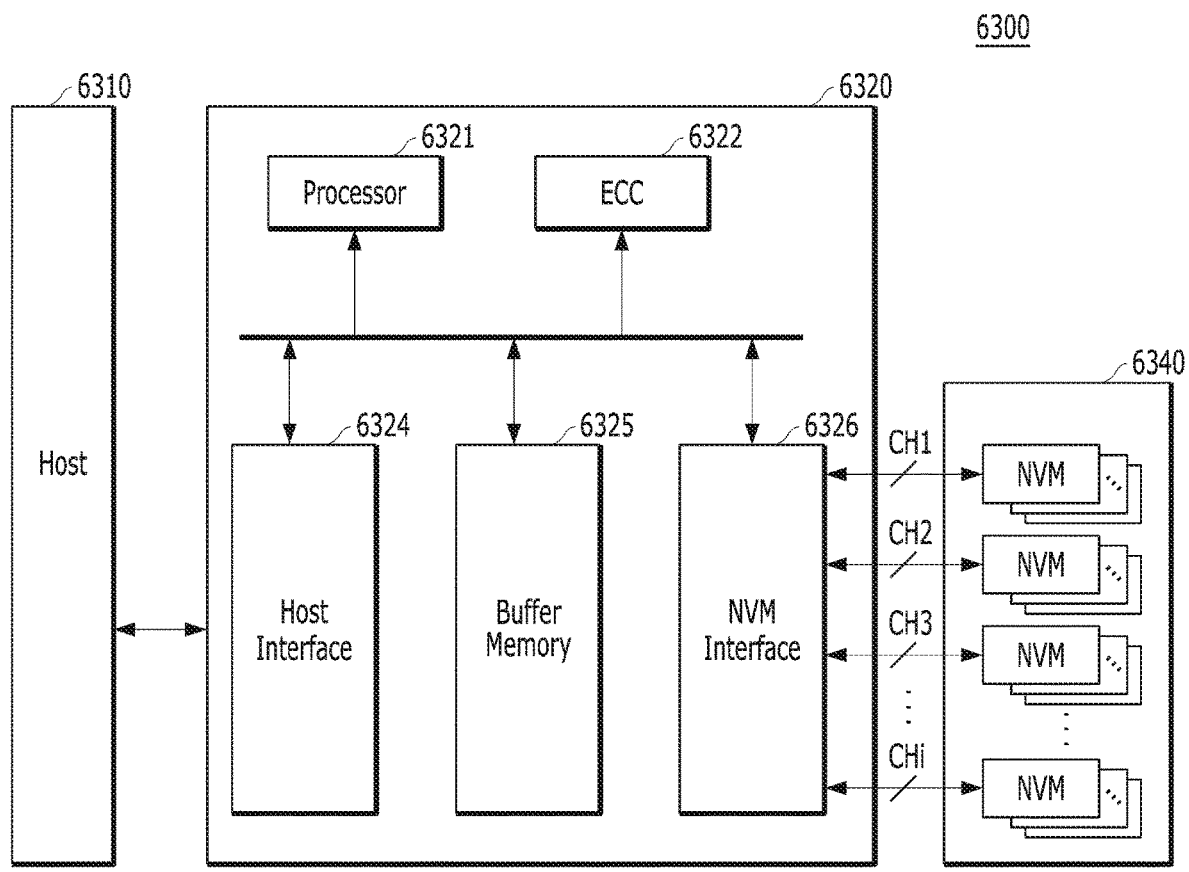

FIG. 10 is a diagram schematically illustrating another example of the data processing system including the memory system in accordance with an embodiment. FIG. 10 schematically illustrates an SSD to which the memory system in accordance with an embodiment is applied.

Referring to FIG. 10, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 10 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 11:
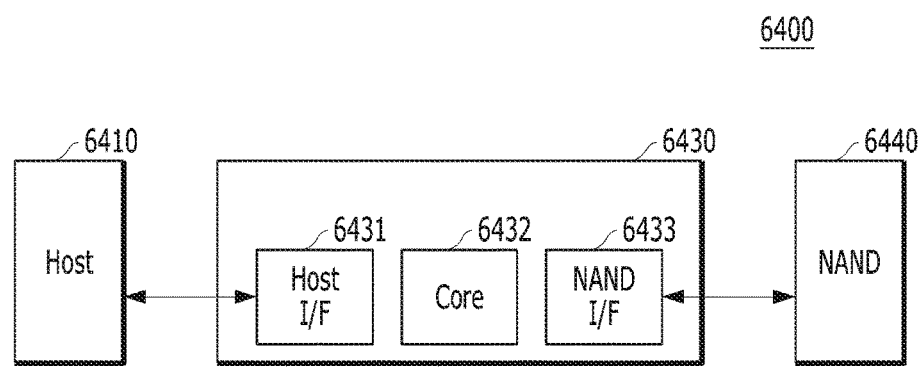
Figure 12:
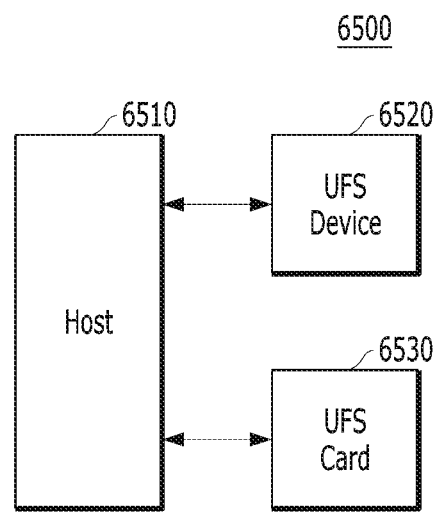
Figure 13:
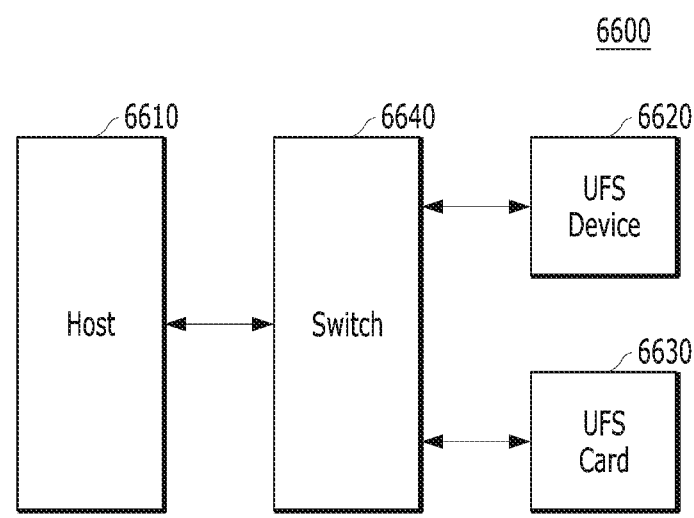
Figure 14:
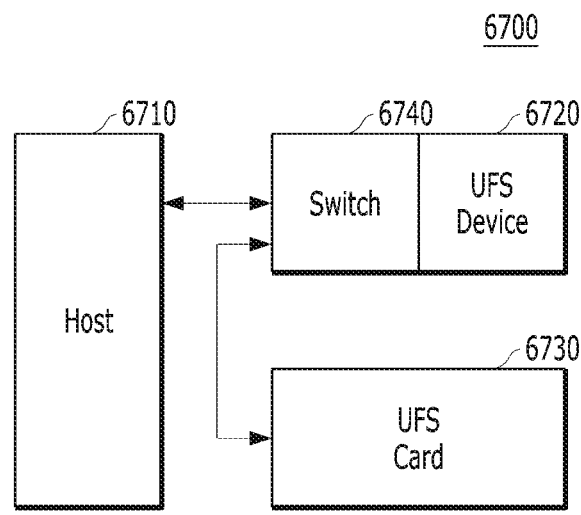
Figure 15:
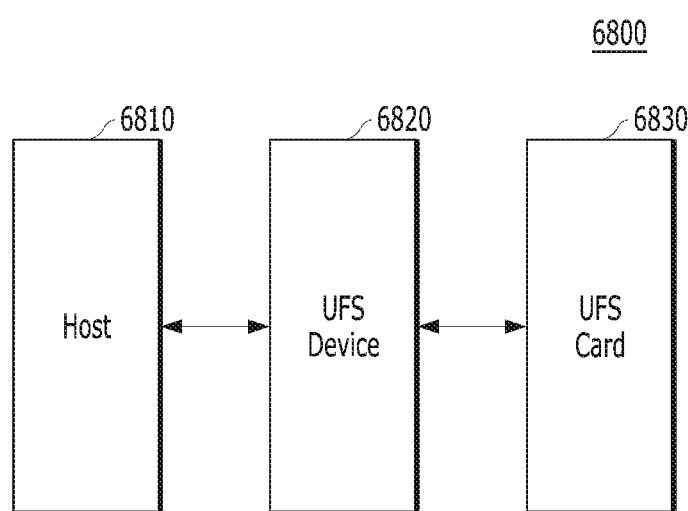

FIG. 11 is a diagram schematically illustrating another example of the data processing system including the memory system in accordance with an embodiment. FIG. 11 schematically illustrates an embedded Multi-Media Card (eMMC) to which the memory system in accordance with an embodiment is applied.

Referring to FIG. 11, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIGS. 1 to 7B. Furthermore, the host interface 6431 may serve as a serial interface, for example, UHS ((Ultra High Speed)-I/UHS-II) interface.

FIGS. 12 to 15 are diagrams schematically illustrating other examples of the data processing system including the memory system in accordance with an embodiment. FIGS. 12 to 15 schematically illustrate UFS (Universal Flash Storage) systems to which the memory system in accordance with an embodiment is applied.

Referring to FIGS. 12 to 15, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIGS. 1 to 7B. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 9 to 11, and the UFS cards 6530, 6630, 6730 and 6830 may be embodied in the form of the memory card system 6100 described with reference to FIG. 8.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

In the UFS system 6500 illustrated in FIGS. 1 to 7B, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In an embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

In the UFS system 6600 illustrated in FIGS. 1 to 7B, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In an embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

In the UFS system 6700 illustrated in FIGS. 1 to 7B, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In an embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

In the UFS system 6800 illustrated in FIGS. 1 to 7B, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In an embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 16:
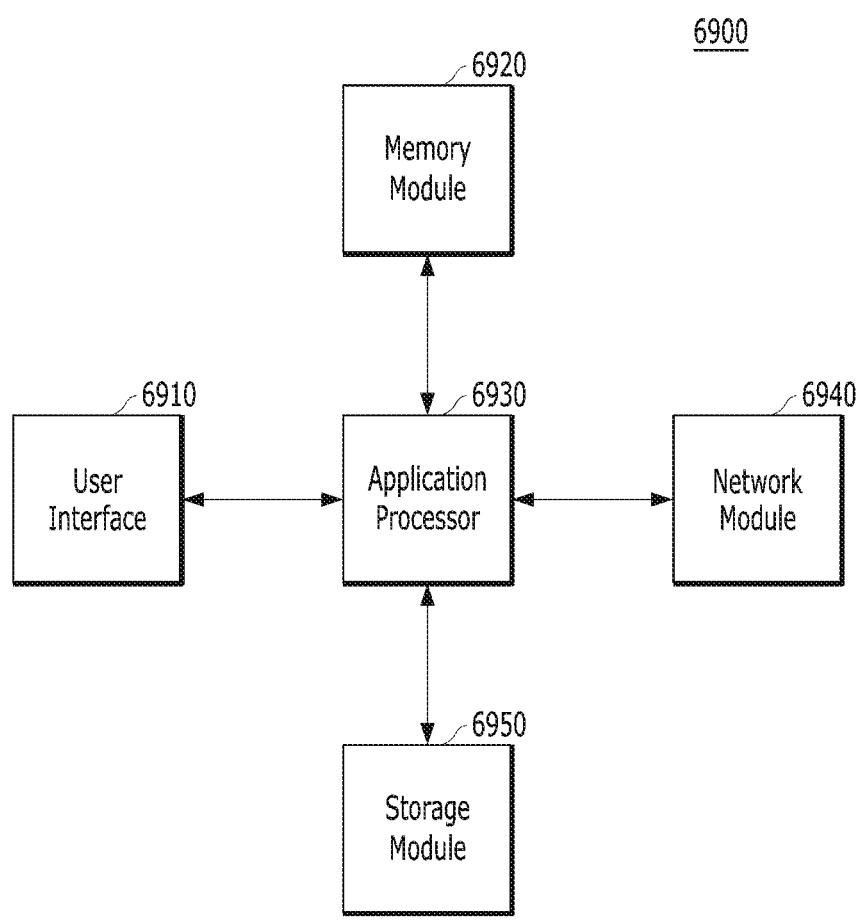

FIG. 16 is a diagram schematically illustrating another example of the data processing system including the memory system in accordance with an embodiment. FIG. 16 is a diagram schematically illustrating a user system to which the memory system in accordance with an embodiment is applied.

Referring to FIG. 16, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as a System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but may also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIGS. 1 to 7B. Furthermore, the storage module 6950 may be embodied as an SSD, eMMC and UFS as described above with reference to FIGS. 10 to 15.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

While the present invention has been described with respect to specific embodiments, it will be apparent to those skilled in the art that various changes and modifications may be made without departing from the spirit and scope of the invention as defined in the following claims.

What is claimed is:

1. A method of a read reclaim operation of a memory controller, the method comprising:
   updating, during a read operation for a read operation unit included in a memory block, a first index for the memory block and a second index for the read operation unit;
   determining the memory block as a warming block when the updated first index is over a first threshold;
   determining the read operation unit as a read-hot-spot when the memory block is the warming block and the updated second index is over a second threshold; and
   programming data of the read-hot-spot into another memory block.

2. The method of claim 1, wherein the first index is a remaining value obtained by subtracting an average read count value of a plurality of memory blocks of a memory device controlled by the memory controller from a read count value of the memory block, in which the read operation is performed for the read operation units.

3. The method of claim 2, wherein the average read count value of the plurality of memory blocks is obtained by dividing sum of the read count values of the plurality of memory blocks by a number of the plurality of memory blocks.

4. The method of claim 1, wherein the second index is a read count, which is increased according to the read operation performed in the read operation unit.

5. The method of claim 1, wherein the read operation unit is the same as or smaller than a page of the memory block.

6. The method of claim 1, wherein the first index is an increased amount of a read count value of the memory block for a predetermined time period.

7. The method of claim 6, wherein the predetermined time period is a time interval, in which an accumulated amount of the read count value of the memory block is over a predetermined value.

8. A controller comprising:
   a counter suitable for updating, during a read operation for a read operation unit included in a memory block, a first index for the memory block and a second index for the read operation unit;
   a detector suitable for determining the memory block as a warming block when the updated first index is over a first threshold, and determining the read operation unit as a read-hot-spot when the memory block is the warming block and the updated second index is over a second threshold,
   wherein the controller programs data of the read-hot-spot into another memory block.

9. The controller of claim 8, wherein the first index is a remaining value obtained by subtracting an average read count value of a plurality of memory blocks of a memory device controlled by the controller from a read count value of the memory block, in which the read operation is performed for the read operation units.

10. The controller of claim 9, wherein the average read count value of the plurality of memory blocks is obtained by dividing sum of the read count values of the plurality of memory blocks by a number of the plurality of memory blocks.

11. The controller of claim 8, wherein the second index is a read count, which is increased according to the read operation performed in the read operation unit.

12. The controller of claim 8, wherein the read operation unit is the same as or smaller than a page of the memory block.

13. The controller of claim 8, wherein the first index is an increased amount of a read count value of the memory block for a predetermined time period.

14. The controller of claim 13, wherein the predetermined time period is a time interval, in which an accumulated amount of the read count value of the memory block is over a predetermined value.

15. A semiconductor memory system comprising:
a semiconductor memory device; and
a controller,
wherein the controller includes:
a counter suitable for updating, during a read operation for a read operation unit included in, a first index for the memory block and a second index for the read operation unit;
a detector suitable for determining the memory block as a warming block when the updated first index is over a first threshold, and determining the read operation unit as a read-hot-spot when the memory block is the warming block and the updated second index is over a second threshold,
wherein the controller programs data of the read-hot-spot into another memory block.

16. The semiconductor memory system of claim 15, wherein the first index is a remaining value obtained by subtracting an average read count value of a plurality of memory blocks of the semiconductor memory device from a read count value of the memory block, in which the read operation is performed to the read operation units.

17. The semiconductor memory system of claim 16, wherein the average read count value of the plurality of memory blocks is obtained by dividing sum of the read count values of the plurality of memory blocks by a number of the plurality of memory blocks.

18. The semiconductor memory system of claim 15, wherein the second index is a read count, which is increased according to the read operation performed in the read operation unit.

19. The semiconductor memory system of claim 15, wherein the read operation unit is the same as or smaller than a page of the memory block.

20. The semiconductor memory system of claim 15, wherein the first index is an increased amount of a read count value of the memory block for a predetermined time period, and
wherein the predetermined time period is a time interval, in which an accumulated amount of the read count value of the memory block is over a predetermined value.

* * * * *